United States Patent [19]

Auriol

[11] 3,840,980
[45] Oct. 15, 1974

[54] HIGH STRENGTH RIVETTED PLATE JOINT
[75] Inventor: Jean Marc Auriol, Flourens-Haute-Garonne, France
[73] Assignee: Ateliers De La Haute-Garonne Etablissements Auriol and Cie, Flourens-Haute-Garonne, France
[22] Filed: June 21, 1971
[21] Appl. No.: 154,806

[30] Foreign Application Priority Data
June 23, 1970 France .............. 70.23158

[52] U.S. Cl. ............... 29/522, 85/37, 29/525, 52/758 D
[51] Int. Cl. ............................. F16b 5/04
[58] Field of Search ......... 287/189.36 D, 189.36 F, 287/189.36 C; 85/37, 39, 70, 77; 29/522, 525, 526

[56] References Cited
UNITED STATES PATENTS
3,270,410  9/1966  Salter et al. ............... 287/189.36 F
3,359,847  12/1967  Richmond ............... 85/37
3,369,440  2/1968  King ............... 85/37 X
3,391,449  7/1968  Briles ............... 287/189.36 D X
3,418,012  12/1968  La Torre ............... 287/189.36 F
3,516,699  6/1970  Bergere ............... 287/189.36 F
3,526,032  9/1970  Pipher ............... 287/189.36 F X
3,630,116  12/1971  Harper ............... 85/37

Primary Examiner—James R. Boler
Assistant Examiner—Wayne L. Shedd
Attorney, Agent, or Firm—Wilfred G. Caldwell

[57] ABSTRACT

A rivet for use in alloy metals having mechanical characteristics of high-quality, constituted by a shank provided with a head at one extremity and bearing a conical section lengthened by a cylindrical part. This rivet is inserted in a hole of a diameter comprised between the highest section and the smaller section of its conical section.

4 Claims, 9 Drawing Figures

PATENTED OCT 15 1974   3,840,980
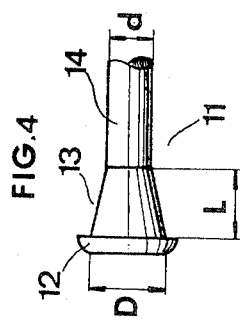
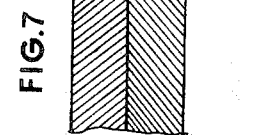
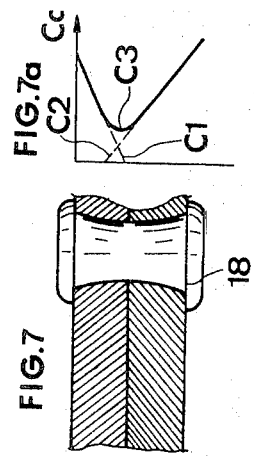
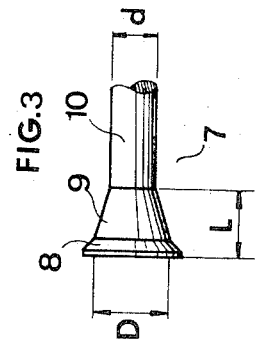
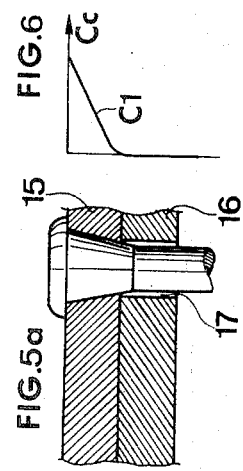
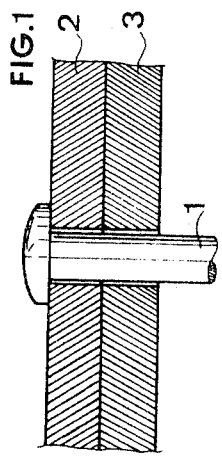
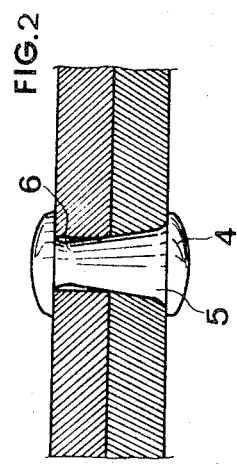
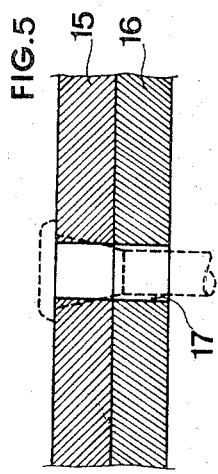

HIGH STRENGTH RIVETTED PLATE JOINT

The invention concerns an assembly of sheets through metal or alloy rivets possessing high-quality mechanical characteristics, more particularly in titanium or titanium alloys; it also concerns a rivet intended for the realization of such assemblies. A metal or alloy having a resistance to breaking through shearing superior to approximately 30 hectobars will be considered a metal or alloy of high-quality mechanical characteristics; for the sake of guidance, resistance to breaking through shearing for titanium is 38 hectobars.

It is known that a rivet is generally constituted of a shank provided with a head at one end; riveting consists of battering the end emerging from the shank in order to form a second head; the sheets are thus gripped between these two heads.

Rivets used for aeronautical purposes are submitted to great strength demands and must therefore be constituted of metals or alloys having high-quality mechanical characteristics which are only limited by the requirement of forming a second head when riveted. The metal must therefore possess characteristics enabling this formation.

A traditional rivet with high-quality mechanical characteristics consists of a cylindrical shank having a diameter slightly inferior to that of the hole into which it is to be inserted so that the play between the two surfaces is in the order of from a few hundreths to two-tenths of a millimeter.

In order to better clarify this report, I represented a classic rivet in FIG. 1 of the drawings in the appendix. This rivet is made of titanium or a titanium alloy and serves to interlock the two sheets 2 and 3; the play of the rivet in the hole is greatly exaggerated in this figure.

The battering of the merging shank end specially carried out by riveting or stamping deforms the rivet and the sheets as seen in FIG. 2; the rivet acquires a slight conicity opening out toward the second head. In the parts, such as 5, near the battered zones, the rivet is considerably dilated (phenomenon exaggerated in FIG. 2); its shank is in close contact with the sheets which were deformed during the process by the expansion of the shank. This phenomenon introduces some constraints of compression between the shank and the sheets which are very favorable to resistance to fatigue. In the parts close to the first head of the rivet and farthest away from the battered one, such as 6, deformation of the rivet is imperceptible — for the subject rivets manufactured in a high-quality mechanical material — so that, after riveting, a certain amount of play in the parts between the rivet and sheets can continue, and the constraints of compression are practically non-existent.

Of course, the existence of such a play is inauspicious to the tightness of the assembly, but, more important, tests for wear have shown that failure of the shank to expand close to the first head presents a far more serious drawback: a test piece, riveted with classic titanium rivets submitted to repeated cycles of constraint wears out (from two to ten times) faster than the same test piece riveted with rivets involving the creation of constraints of compression between sheets and shank for their entire length.

Aeronautical engineers or, more generally, engineers who must realize light assemblies at high resistance have consequently resorted to the following alternatives: either they use rivets in a material of high-quality mechanical chareteristics; in this case, as it was explained above, a play between sheets and rivet can exist after riveting and, in any case, the induced constraints of compression are so weak that resistance to wear is considerably reduced; or they use "more flexible" rivets which, during riveting, deform sufficiently to eliminate the play between the surfaces and to carry along constraints of compression; in this case, however, the mechanical resistance of these rivets is insufficient with regard to the strengths to which they are submitted.

To avoid this alternative, I thought of realizing rivets presenting a conical portion which is introduced by force, prior to forming the second head, in a conical hole prepared in the sheets. This procedure very perceptibly improves the resistance to fatigue in the assemblies, for if the conical hole is suitably dimensioned, it introduces contraints of compression for the entire length of the rivet shank in the sheets. At any rate, except for the areas close to the second head where they have a higher value due to the dilation of the rivet, these constraints of compression are almost uniformly distributed along the length of the shank, and I noticed that breaking intervened on the length of the sheets near the pre-formed rivet head. Studies have in fact demonstrated that it is in this zone that alternate traction strength is most important.

I tried to create stronger constraints of compression along the rivet shank so that the value of these constraints would be sufficient under the preformed head to carry a resistance to fatigue, thus eliminating all risks of breaking in this zone. The creation of such constraints, however, in an assembly where they are uniformly distributed along the rivet shank causes superfluous constraints in this central part and useless deformations when the rivet is inserted. This is followed by a risk of creating friction scarves between the rivet and the sheets. Furthermore the realization of such assemblies with considerable constraint on the entire rivet shank is accompanied with difficulties in its insertion due to the considerable energy required to penetrate the rivets.

It must also be noted that the making of perfectly conical holes in the sheets requires special and expensive equipment as well as special precautions such as precise control in the tool's depth of penetration.

The present invention aims at palliating these inconveniences and to furnish a rivet assembly in which the constraints of compression between sheets and rivet are adjusted to optimum values, functions of the section considered along the rivet shank; these assemblies, improved by this resistance to fatigue will benefit considerably, and there are none of the precited risks nor are there greater difficulties of realization.

For this reason the rivets utilized to realize the assembly according to the invention are made up of a shank equipped by a head at one end and endowed with a conic portion adjacent to the latter for which the widest section is located on the side of this head; this conical part presents a slope sensibly included between 1 and 15 percent while the diameter of its wide part $D$ in relation to the diameter of its narrow part $d$ is appreciably included between 1.05 and 1.25 ($1.05 \leq D/d \leq 1.25$). Each rivet is introduced in a cylindrical hole drilled in the sheets of $e$ diameter appreciably included between, for one part, the diatemer of the narrow section $d$ of the conical part of the rivet and, for another part, the average value $(D + d)/2$ of the diameters of the large part $D$ and the narrow part $d$ of this conical portion. The rivet can be made in titanium which adds the very valuable qualities of lightness in aeronautics to the qualities of mechanical resistance.

After the rivet is inserted and prior to formation of the second head, the constraints of compression in such an assembly are at a maximum under the preformed head and diminish from this zone to where the shank engaged by force but not yet battered is no longer in contact with the sheets.

The formation of the second head involves the creation of new constraints which are at a maximum under this second head and decrease from it. The definitive distribution of the constraints of compression result from the composition of these two distributions: the resulting constraints, non-uniformly distributed are at a minimum in the central part of the assembly and increase toward its two edges in order to present the maximum value under the preformed and battered heads. As was explained above, this distribution differential is considerably favorable to the assembly's resistance to fatigue and cuts down on breaking under the head in particular. Furthermore, the energy of penetration required for insertion of the rivet is moderated, and the realization of cylindrical holes at diameters included in the above defined areas is an operation which can be easily executed with neither special equipment nor particular precautions.

In the preferred method of realization, the conical portion of the rivet is lengthened by a cylindrical part having a diameter equal to that of the small part of the said conical portion. In this way, the same rivet may serve to assemble sheets of various degrees of thickness. This enables a great diversity of uses for the subject rivet and considerably reduces the number of sizes necessary. Advantages in stocking are thus realized and an increase in equipment avoided.

Furthermore, the end emerging from the cylindrical part of the shank enables a perfect centering of the rivet in its hole upon insertion in a practical way.

This invention will be more comprehensible upon the reading of the following detailed description and the examination of the appendixed diagrams; in these diagrams:

FIGS. 1 and 2 are diagrams of a classic riveting arrangement and have already been commented upon;

FIGS. 3 and 4, in the way of an unlimited example, show two ways of using the rivets so as to realize an assembly according to the invention;

FIG. 5 shows two pieces to be joined together with a cylindrical hole therethrough and a rivet in accordance with the present invention dotted in to show the relative sizes of the parts of the rivet to the cylindrical hole;

FIG. 5a shows the rivet actually in place in the cylindrical hole;

FIG. 6 is a constraint distribution chart for the structure of FIG. 5a;

FIG. 7 shows the structure of FIG. 5a with the rivet battered into permanent place; and FIG. 7a shows a constraint diagram for the structure of FIG. 7.

Rivet 7, represented in FIG. 3, is comprised of a fraised head 8 and a shank, partly conical 9 and partly cylindrical in its terminal part 10. For the sake of comparison, rivet 11, represented in FIG. 4, bears a flattened round head 12 and a shank, partly conical 13 of length L and partly cylindrical in its terminal part 14.

The large sections of the conical parts of these rivets have a diameter equal to D, while the small sections have a diameter equal to $d$.

By way of example, the chart below indicates (in millimeters) values for sizes L, $d$, D and their tolerances for the range of titanium rivets used in the assembly of aluminium alloy sheets which are currently used in aeronautics. 0 represents the nominal diameter for the drilling of holes into which the rivets are to be inserted.

| 0 | L | d | D |
|---|---|---|---|
| 2,50 | 1,8 ∓ 0,2 | 2,40 ∓ 0,04 | 2,63 ∓ 0,05 |
| 3,30 | 2,4 ∓ 0,2 | 3,20 ∓ 0,05 | 3,43 ∓ 0,05 |
| 3,70 | 2,70 ∓ 0,25 | 3,60 ∓ 0,05 | 3,83 ∓ 0,05 |
| 4,10 | 3,00 ∓ 0,25 | 4,00 ∓ 0,06 | 4,23 ∓ 0,05 |
| 4,90 | 3,60 ∓ 0,25 | 4,80 ∓ 0,06 | 5,03 ∓ 0,05 |
| 5,70 | 4,20 ∓ 0,25 | 5,60 ∓ 0,06 | 5,83 ∓ 0,05 |

FIG. 5 is a diagram of two assembly sheets 15 and 16 in which a cylindrical hole 17 has been made. A rivet corresponding to the invention has been dotted in and serves to realize the assembly. It has been sized in relation to hole 17 as indicated in the above chart. When inserted, the rivet will penetrate the cylindrical hole 17 (FIG. 5a). Sheets 15 and 16 undergo a deformation in the zones adjacent to the conical section of the shank having a diameter superior to that of the hole. In these zones, even before formation of the second head, the deformed sheet is joined without play but with constraints of compression on the part corresponding to the shank.

The constraint distribution in the sheets is represented in FIG. 6 by curve $C_1$; it can be seen that this distribution is at a maximum under the head and decreases toward the junction of sheets 15 and 16.

After formation of the second head (FIG. 7), the zones 18 located near the battered areas are dilated; the matter has fallenback towards the interior of the hole. In these zones, the rivet shank is in close contact with the constraints of compression and with the sheets which were deformed by the shank by an amplitude in proportion to the zone closest to the battered part.

The formation of the second head introduces new constraints for which distribution along the shank is diagrammed by the dotted curve $C_2$ in the diagram of FIG. 7a; distribution of resulting constraints is therefore similar to that represented in curve $C_3$. These constraints of compression, which are at a maximum under the two heads, considerably improve the resistance to fatigue of the assemblies; experience has proven, in particular, that in such assemblies, sheets do not have less resistance to alternate traction strength in the zones adjacent to the shank than elsewhere. In spite of the great number of alternate constraint cycles to which test pieces were submitted, more breaking under the head was not evidenced.

The interest of assemblies corresponding to the invention can therefore be conceived. They benefit from resistance to fatigue in the order of from two to ten times greater than that of known assemblies and do not present any particular difficulties in their realization.

Of course, the present description does not limit the scope of the invention in any way whatsoever. On the contrary, it is available to all variants in the reach of the men of the art.

What is claimed is:

1. A method of riveting together a plurality of superposed sheets by means of a metal rivet having a head, a frusto-conical shank portion extending from the head, the larger diameter D of the shank portion being adjacent the head and the ratio of diameter D to the smaller diameter d of the shank portion lying in the range $1.05 \leq D/d \geq 1.25$, the degree of convergence of the portion being between 1 percent and 15 percent; the method comprising the steps of forming a cylindrical hole in the sheets having a diameter between the diameter $d$ and the average value $(D+d)/2$ of the larger and smaller diameters, inserting the rivet in the hole, and deforming the end of the rivet remote from the head to secure together the sheets.

2. A method according to claim 1, wherein the sheets are of light alloy metal.

3. A method according to claim 2, wherein the sheets are of aluminium alloy.

4. A method according to claim 1, wherein the rivet is comprised of a material selected from titanium and titanium alloys.

* * * * *